United States Patent [19]
Woodward

[11] 3,841,695
[45] Oct. 15, 1974

[54] STAKE POCKET ADAPTER

[76] Inventor: Ernest F. Woodward, 11 Circle Dr., Camp Hill, Pa. 17011

[22] Filed: Mar. 21, 1973

[21] Appl. No.: 343,578

Related U.S. Application Data

[62] Division of Ser. No. 210,498, Dec. 21, 1971, Pat. No. 3,764,177.

[52] U.S. Cl. .................. 296/43, 105/390, 403/227, 403/369
[51] Int. Cl. .............................................. B60p 7/06
[58] Field of Search ............. 296/43; 280/143, 147; 105/380, 382, 386, 390; 403/225, 227, 243, 369, 370

[56] References Cited
UNITED STATES PATENTS

| | | | |
|---|---|---|---|
| 2,456,480 | 12/1948 | Austin | 85/67 X |
| 3,361,460 | 1/1968 | Jansen | 403/370 X |
| 3,421,726 | 1/1969 | Getter | 296/43 X |
| 3,503,638 | 3/1970 | Holzel | 403/370 |
| 3,595,125 | 7/1971 | Jacobs | 296/43 X |
| 3,674,304 | 7/1972 | Swanson | 296/43 |

*Primary Examiner*—Robert J. Spar
*Assistant Examiner*—Leslie J. Paperner
*Attorney, Agent, or Firm*—Jay M. Cantor

[57] ABSTRACT

An adapter for supporting the bottom portion of a stake or post of predetermined dimensions, the device being dimensionally adjustable to be securely retained in sockets of various dimensions.

5 Claims, 13 Drawing Figures

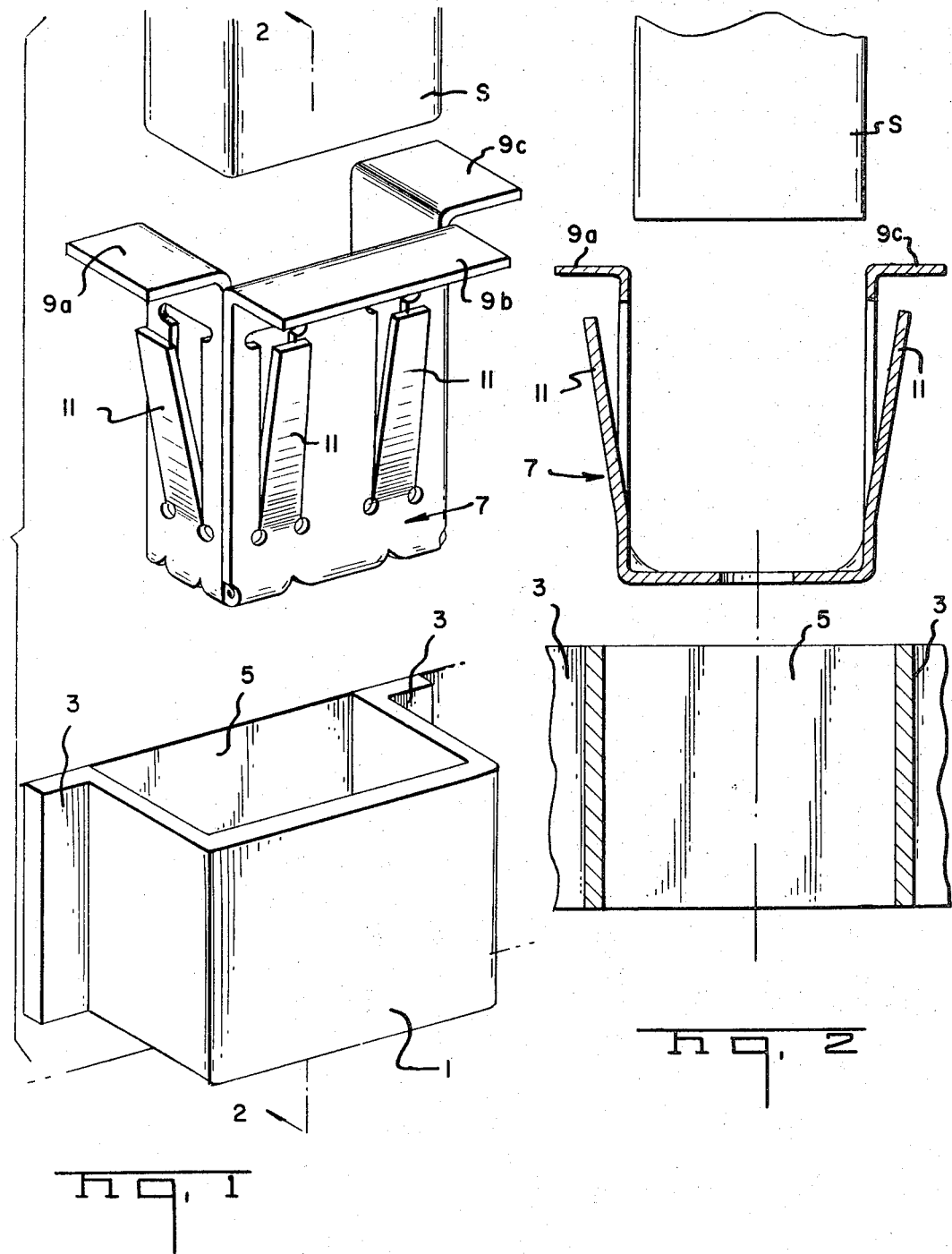

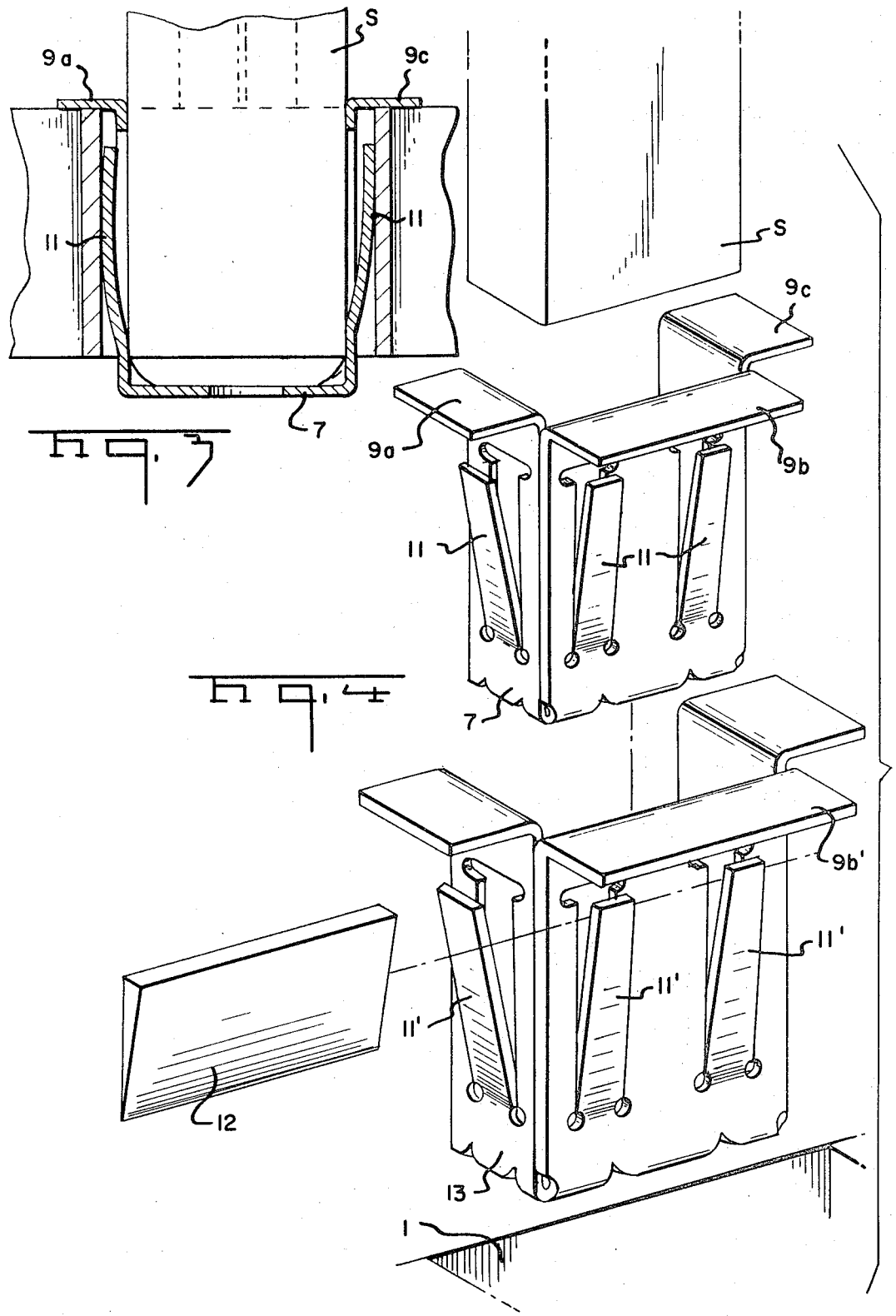

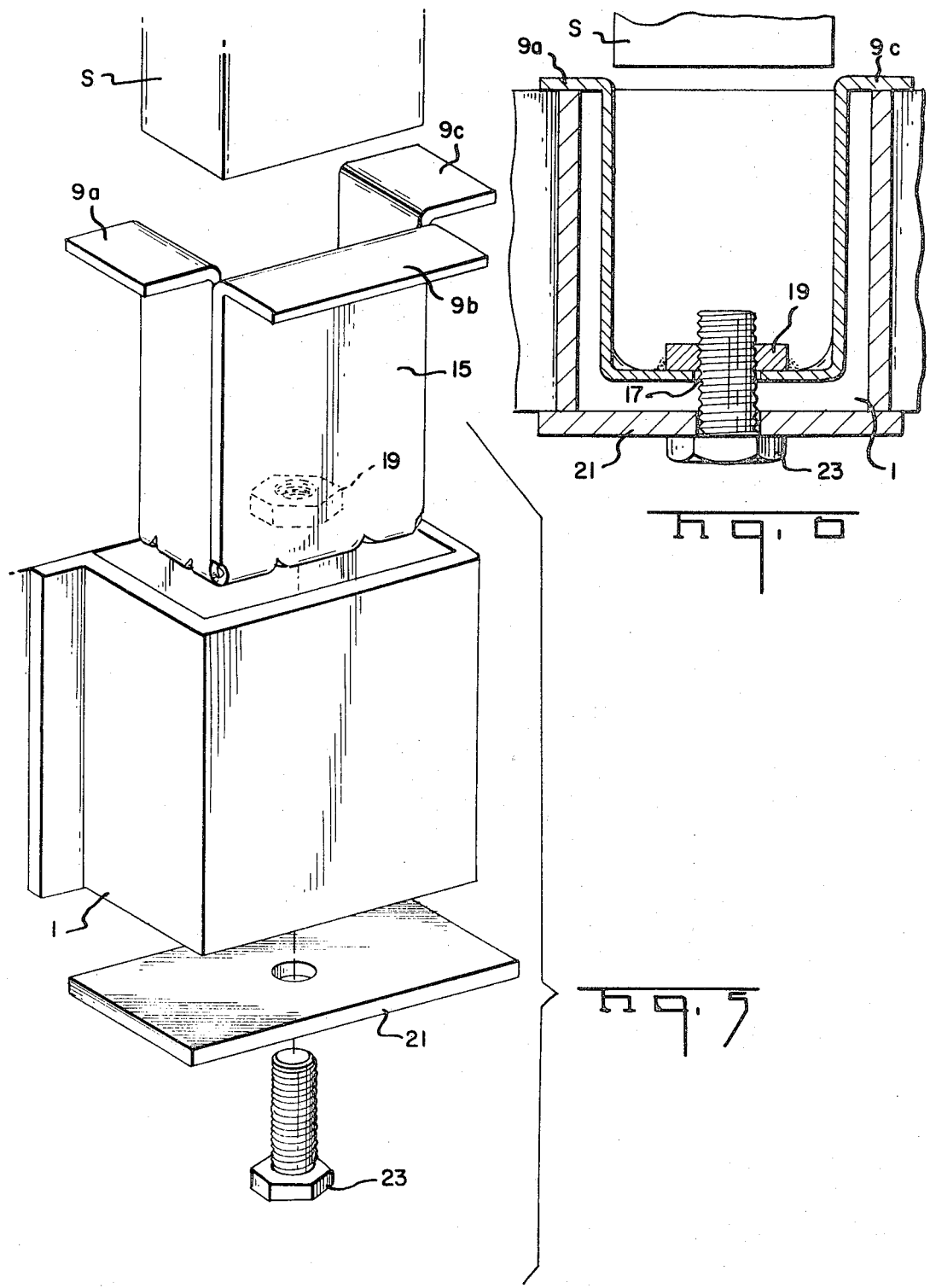

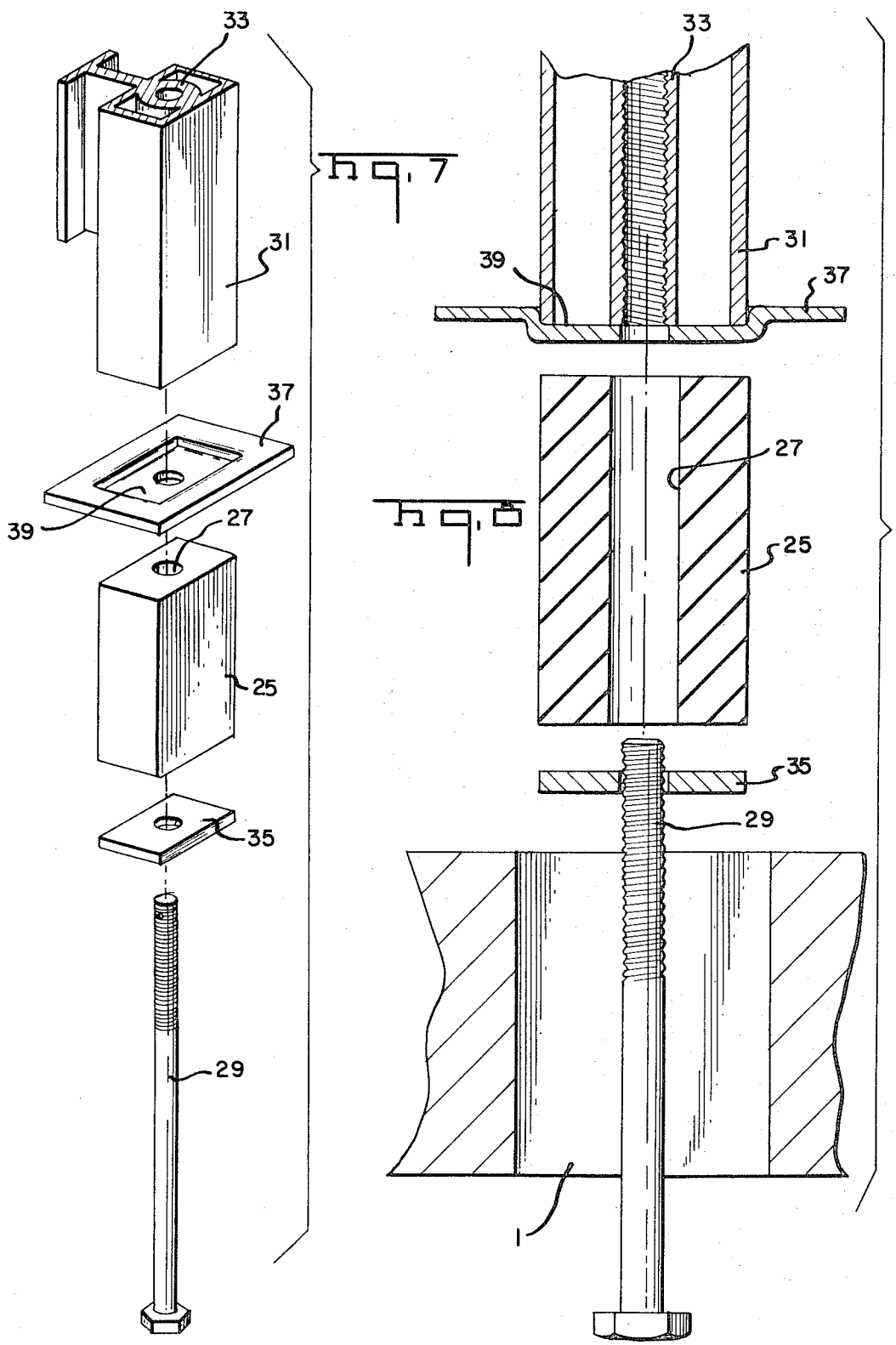

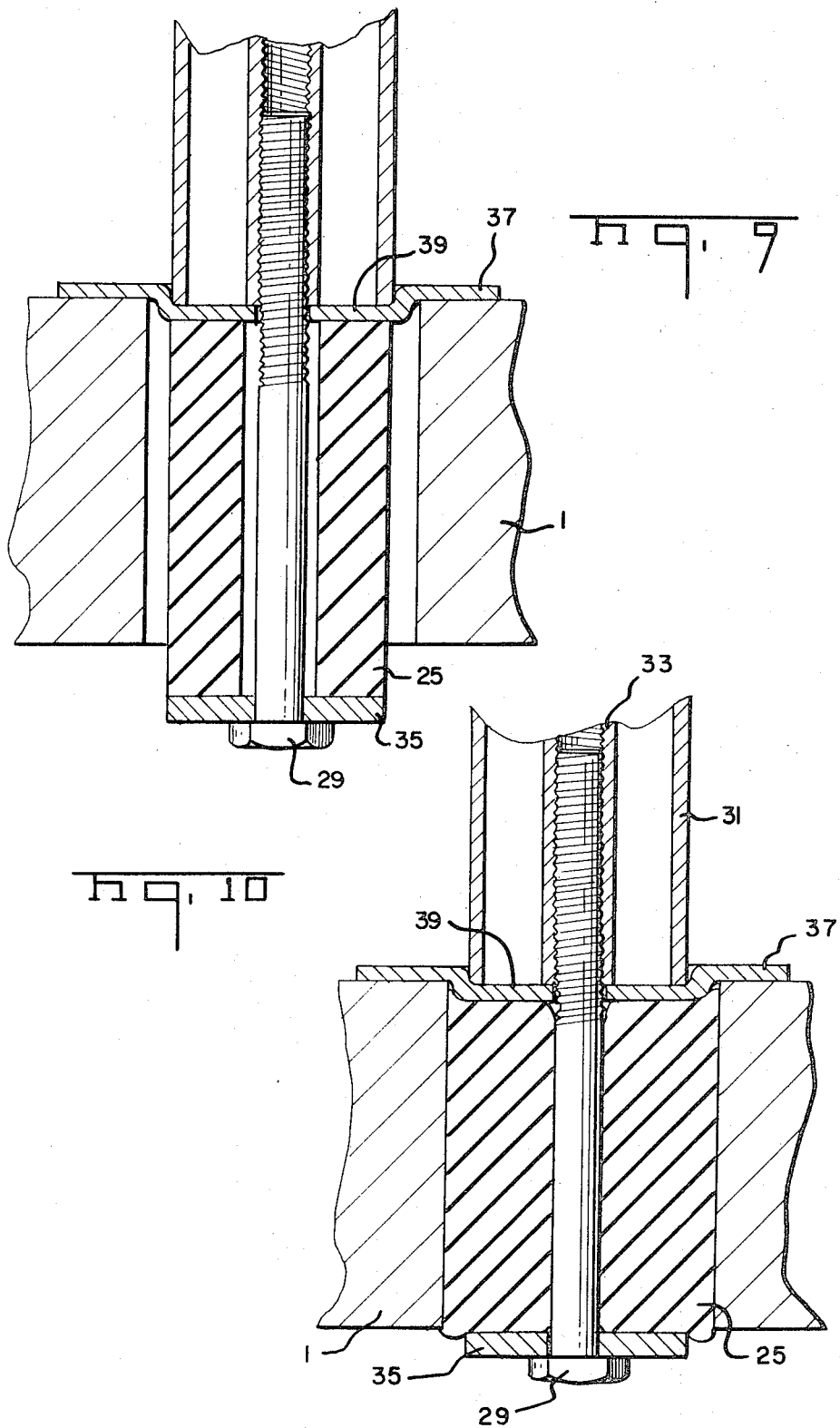

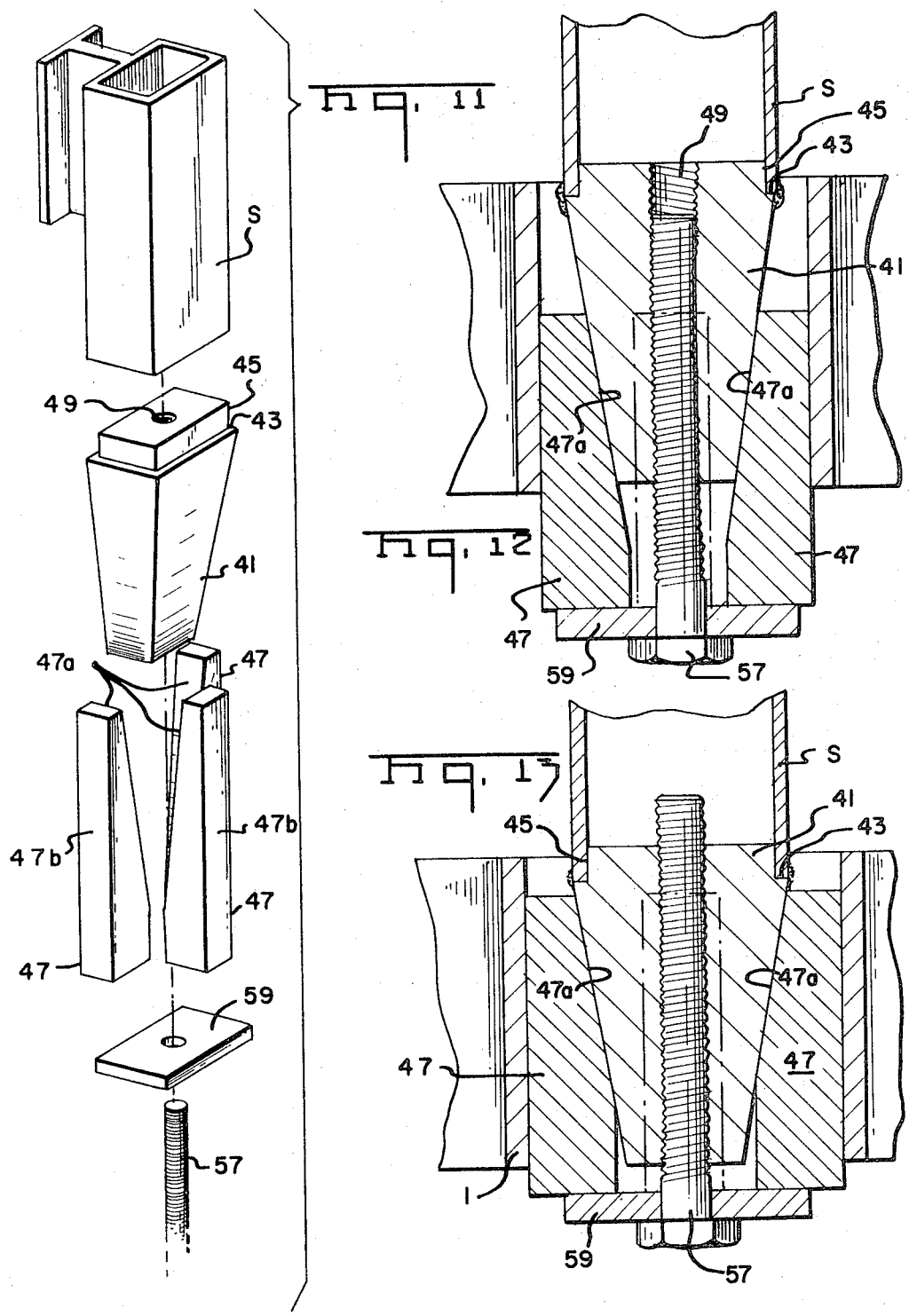

STAKE POCKET ADAPTER

This is a division of application, Ser. No. 210,498, filed Dec. 21, 1971, now U.S. Pat. No. 3,764,177.

Cargo carrying vehicles such as flat bed trucks, trailers or railway cars which are sold without side panels, are usually provided by the manufacturer with sockets or stake pockets for anchoring stakes therein. The sockets are usually in the form of short metallic sections of open channel form comprised of a pair of parallel side walls connected by a web, the face ends of the side walls being provided with outwardly extending flanges. The bed or floor of the vehicle is provided with a metallic edging strip about its sides and ends to which the flanges are welded with the open end of the channel facing the strip, the web facing outwardly. It has been found that for the various makes and models of such cargo carrying vehicles, there is no uniformity of "stake pocket" sizes. In addition, few pockets on any new trailer are of the exact same dimensions. It is therefore impossible to supply a standard uniform stake upright which will properly fit all the pockets on all trailers or trucks or even on those of one such vehicle in which the pocket dimensions sometimes vary.

In my copending application Ser. No. 186,051 filed Oct. 4, 1971, now U.S. Pat. No. 3,794,375, I have disclosed stake uprights which are provided with groove forming structures and which, when inserted in the pockets, receive the marginal side edge portions of panel members which are utilized for enclosing the sides of the vehicle when it is desired to enclose the cargo. In order to make these and other conventional stakes without such groove-forming structures of standard uniform dimensions so that they can be rigidly anchored in sockets or various dimensions, an adapter has been provided that will rigidly support the bottom portion of the stake and which can be inserted in the sockets of different dimensions. Such adapter as hereinafter described, is capable of accommodating itself to various dimensions of a stake socket or pocket while being capable of securely retaining the stake of standard uniform dimensions, upright.

It is therefore a general object of this invention to provide an adapter for enabling stake uprights of predetermined standard dimensions to be rigidly supported in stake pockets of various dimensions.

It is a specific object of the invention to provide an insert for stake pockets of various dimensions in order to rigidly support a stake of standard dimensions.

In accordance with the above objects, a stake pocket insert has been provided which can adapt itself to the dimensions of various sizes of pockets or which can be rigidly secured within pockets of various dimensions to rigidly support a stake in upright position. The structure of this insert will now be explained in detail with specific reference to the drawings in which:

FIG. 1 is a perspective view of one form of adapter insert showing the stake which it is to receive and the socket into which it is to be inserted.

FIG. 2 is a cross-section of the parts along line 2—2 of FIG. 1.

FIG. 3 is a longitudinal cross-section similar to FIG. 2 showing the insert within the socket.

FIG. 4 is a perspective view of a standard and an oversized insert, the oversized socket and the standard stake.

FIG. 5 is a perspective view of a second form of stake pocket adapter ready for insertion into the pocket and for receiving a standard stake.

FIG. 6 is a cross-sectional view of the adapter of FIG. 5 assembled within the pocket and the means for retaining it therein.

FIG. 7 is an exploded view in perspective of a third form of adapter, the stake which it is to support.

FIG. 8 is a cross-sectional view of the device of FIG. 7 further showing the stake pocket for receiving the adapter.

FIG. 9 is a longitudinal cross-section showing the parts of FIG. 8 in assembled relation within the stake pocket.

FIG. 10 is similar to FIG. 9 showing the insert fully expanded to firmly engage the inner pocket wall for retention therein.

FIG. 11 is an exploded view in perspective of a fourth modification together with a hollow stake.

FIG. 12 shows the parts of FIG. 11 in partly assembled relation in vertical cross-section.

FIG. 13 shows the parts of FIG. 12 in fully assembled relation.

The socket, commonly known as a stake pocket, conventionally provided on cargo carriers such as open flat bed trucks, trailers or railway cars, is shown in FIG. 1 as a channel section 1 of metal having flanges 3 extending outwardly from the upper ends of the side walls thereof. These flanges are secured, as by welding, to the metal strap 5 which extends about the edge of the floor of the cargo carrier, the strap forming one wall of the socket. While the stake pocket is here shown as rectangular in cross-section, it may be oval or of other geometric shape and it is understood that the insert or adapter of this invention will be correspondingly shaped. The insert or adapter 7 is of generally open box-like form having a bottom and an open top with one side wall of the box removed. Each of the remaining three side walls is provided at its face end with an outwardly extending flange 9a, 9b and 9c, respectively. The adapter is made of flat sheet metal which can be stamped out to form the sides, which are then folded to form the generally box-like structure above described. The side walls of the insert 7 are provided with fingers or lances 11 which may be struck or punched out from the material of the walls.

The insert 7 is assembled to the pocket 7 by inserting it therein with the bottom wall thereof down and the open side of the adapter toward the strap 5. As shown in FIG. 3, the adapter is forced downwardly until the flanges 11 seat on the top edge of the socket wall, the fingers or lances 11 providing pressure against the pocket wall to maintain the insert firmly therewithin. The insert, together with the strap 5, provides a pocket of predetermined dimensions within which a stake S having a bottom portion of corresponding dimensions may be firmly seated. Regardless of variations in dimensions of the pockets which are originally furnished with the cargo carrier, a stake having a bottom portion of standard predetermined dimensions may be supported therein with the above described adapter. Where the original pocket on the vehicle is of greatly oversized dimensions, a second insert, such as 13 in FIG. 4, may be provided which is constructed similarly to the adapter 7 but dimensional on the one hand, to fit within the socket with its fingers or lances 11' in firm engagement with the socket wall while on the other hand, forming a pocket of the proper dimensions to receive a smaller but standard sized adapter 7 which can firmly retain a stake of standard dimensions therein. If necessary or desired wedges, one which is shown at 12, either straight or tapered may be provided between the lances and inner wall of the socket to form added bearing surfaces for increasing the pressure.

In the modification of FIGS. 5 and 6, the adapter 15 is constructed similarly to the adapter 1 of FIG. 1, with the difference that the fingers or lances are omitted. Instead, the bottom wall of the adapter 15 is provided with an opening 17 and a threaded nut 19 may be welded to the bottom wall with its threaded bore in alignment with the opening. After inserting the adapter in the socket until the flanges 9a–9c rest on the upper edge of the socket wall, a rigid plate 21 having a dimension to extend across and beyond the bottom edge of the socket wall is provided. The plate has an opening 21 aligned with the opening 17 for the insertion of a threaded bolt 23 which threads into the nut 19 to firmly secure the adapter therein.

In the modification of FIG. 7, the adapter comprises a solid block 25 of resilient, compressible material which can be inserted in the socket. The block is provided with a central longitudinal bore 27 therein for accommodating an elongated threaded bolt 29 extending therethrough. The stake, which is to be of standardized dimensions here shown as 31, may be of hollow construction, if so desired, and provided with a longitudinally extending cylindrical member 33 which is internally threaded and secured to the inner wall of the stake. Secured to or integral with the outer surface of the stake is a bar T which is T-shaped in cross-section with the head of the T-spaced from the surface of the stake to form a pair of grooves therebetween for the respective reception of the edge portions of panels, as described in my aforementioned copending application Ser. No. 186,051, now U.S. Pat. No. 3,794,375.

A bottom pressure plate 35 having a central opening is adapted to fit within the socket against the bottom of the block 25 when the latter is inserted therein. A top pressure plate 37 having a central opening and of dimensions to extend across and be supported by the top edge of the socket 1, is provided with a depressed central portion 39 of a shape and dimensions to seat the base portion of the stake therein, the bottom wall of the depression preferably fitting within the socket. With the plate 37 supported on top of the socket wall and the stake within the seat 39, the block 25 may be inserted upwardly from the open bottom of the socket 1 against the upper pressure plate 37, as shown in FIG. 9. The bolt 29 is slipped through the bottom pressure plate 35 and then inserted through the opening in the block for threaded engagement with the threads of the cylinder 33 within the hollow stake. By rotating the bolt 29 with its threaded end within the cylindrical member 33, the pressure plates are forced towards one another thus compressing the block 25 lengthwise to expand it laterally into firm engagement with the socket wall as shown in FIG. 10.

In the modification shown in FIGS. 11–13, the socket insert or adapter is comprised of a rectangular block of material 41 having tapering sides which converge downwardly. The material of the upper surface of the block is cut away about its marginal edge portion to an appreciable depth to leave a ledge portion 43 thereabout. The ledge thus formed, provides a seat for the bottom edge of the hollow stake S while the upper portion 45 of the block extends upwardly into close fitting engagement with the interior of the hollow stake. In order to secure the block 41 within the socket, there are provided at least three wedge members 47, each of which has one face 47a tapered to the same degree as the face of the block 41 but in the opposite direction. The faces 47b opposite the tapered faces 47a conform to the shape of the socket wall which as shown, is flat. The block 41 is provided with a central longitudinal bore which is threaded to receive a bolt 51. Since the wedges 47 and block 41 are oppositely tapered, the latter will be held firmly between the tapered faces of the wedges when the block is moved downwardly relative to the wedges, while the latter are within the socket with the flat faces 47b against the inner wall of the socket. In order to move the block and wedges in opposite directions to secure them within the socket, a pressure plate 59 is provided against which the lower ends of the wedges abut, so that upon rotation of the bolt 57, the head thereof bears against the plate to force the wedges upwardly while its threaded end within threaded bore 49 forces the block downwardly to generate large lateral pressures for securing the block within the socket. Obviously, the arrangement just described is effective to mount the block within sockets of various dimensions. The block 41 may be of metal, wood or rubber and be capable of withstanding sufficient pressure to maintain itself and the wedges firmly within the socket. Although the socket and block 41 are described as being rectangular in cross-section, obviously other shapes with corresponding changes in the shape of the wedges may be effectively utilized.

Having thus described the invention with the required particularity, it should be understood that such description is merely illustrative and is not intended as being limiting; and that obvious changes in structure shall fall within the scope of the invention as set forth in the following claims.

What is claimed is:

1. In a cargo carrier comprised of a platform provided with vertical stake pockets,
   the stakes each being provided with a longitudinally extending threaded opening,
   means in the pocket for supporting a stake in upright position comprising,
   a plate provided with a central opening extending across the upper end of a pocket and forming a support for, the lower end of the stake,
   a resiliently compressible member in the pocket having an opening aligned with that in the plate and stake,
   and means having a portion extending through the opening in the plate and member and cooperating with the threaded opening in the stake to compress the member against the plate to expand it laterally into firm engagement with the pocket wall and to secure the stake in upright position to the plate.

2. In a cargo carrier according to claim 1, in which the plate is provided with a depressed portion extending into the pocket and forming a seat for the bottom portion of the stake.

3. In a cargo carrier according to claim 2, wherein the means for compressing the member and securing the stake to the plate includes a bolt having a threaded portion in the stake opening and a flat plate between the lower end of the member and the bolt head.

4. A structure for supporting a hollow stake in the vertically extending stake pocket of a cargo carrier having a platform provided with such pockets comprising, first means including a downwardly coverging tapered block in the pocket, second means including a plurality of upwardly converging tapered wedges between the inner surface of the pocket and the outer surface of the block, means for moving the block and wedges in opposite directions to force the wedges into firm engagement with the inner surface of the pocket and for maintaining the block between the wedges, and means for supporting the stake comprising an upward extension on the upper surface of the block for insertion in the lower end of the stake and conforming to the inner dimensions thereof, the upper surface of the block being provided with a ledge about the base of the extension for seating the bottom of the stake.

5. A structure according to claim 4 wherein the means for moving the block and wedges in opposite directions comprises, a threaded bolt, the block being threaded to receive the bolt thread, and a washer between the bolt head and lower ends of the wedges, whereby rotation of the bolt causes such movement.

* * * * *